April 24, 1951  J. P. FRANCESCO  2,549,793
SNAP FASTENER
Filed July 25, 1947

Inventor
JOHN P. FRANCESCO
By D. C. Snyder
Attorney

Patented Apr. 24, 1951

2,549,793

UNITED STATES PATENT OFFICE 2,549,793

SNAP FASTENER

John P. Francesco, Haverhill, Mass.

Application July 25, 1947, Serial No. 763,708

9 Claims. (Cl. 85—7)

(Granted under the act of March 3, 1883, as amended April 30, 1928; 370 O. G. 757)

This invention relates in general to a snap fastener and is more particularly described as a self locking rivet used for binding together or fastening metal sheets, canvas, upholstery, and the like, and for attaching or securing articles together or to other supports, the fasteners of which are difficult to apply or are ordinarily inapplicable by conventional methods.

An important object of the invention is to provide a snap fastener which may be applied from the outer or exposed surface of an article to be fastened without access to the other side of the article.

A further object of the invention is to provide a removable fastener which may be quickly and easily applied and removed, and repeatedly used without material deterioration.

Another object of the invention is to provide a snap fastener which is readily adjustable for clamping and engaging materials of different thicknesses.

Other objects of the invention will appear in the specification and will be apparent from the accompanying drawings, in which, Fig. 1 is a sectional view of a snap fastener in accordance with the invention in attached or clamping position:

Figure 1:
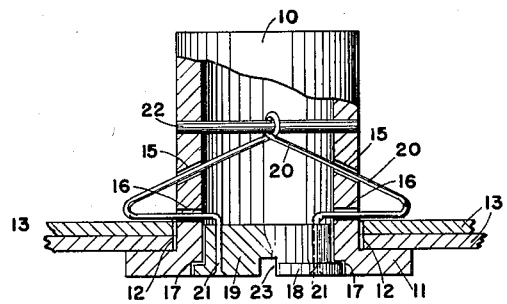
Figure 2:
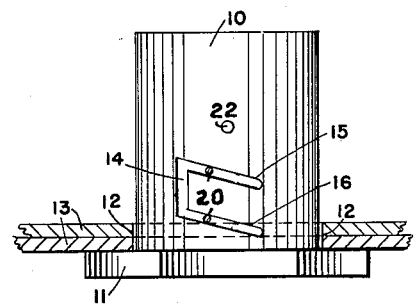
Fig. 2 is a side elevation of the snap fastener.

In attaching various articles together, such as sheet metal units, upholstery, canvas, and the like, one side only of the material may be accessible. If both sides of the articles are accessible rivets, staples, or other fasteners may be applied, but to apply fasteners from one side, gripping or clamping parts must be inserted from the one side but also engaging the other or rear side. The present invention provides a snap fastener in the form of a hollow rivet adapted to be inserted through an opening in a part of parts to be joined, clamped, or attached, with a disengageable spring member applied through the hollow portion of the rivet at one end thereof to engage the rear of the article to which it is applied.

Referring now more particularly to Figs. 1 to 4 of the drawings, a hollow sleeve 10 has a flange 11 at one end preferably angularly headed like a nut. The sleeve may be inserted into a hole 12 in any material 13 until the flange 11 abuts the outer surface, or into registering holes of several sheets or materials 13.

In opposite side walls of the sleeve are substantially longitudinal slots 14 each having lateral extensions 15 and 16 from opposite ends inclined therefrom toward the flange 11. The nearest extension 16 is spaced so that it crosses the line of the rearmost surface of the material to be clamped or engaged, and constitutes a clamping slot.

In the flanged end of the sleeve is a shouldered recess 17 to receive a corresponding flange 18 of a plug 19 which fits within the sleeve, and by insetting the flange 18 in the recess the outer end of the plug is flush with the outer surface of the sleeve.

Figure 3:
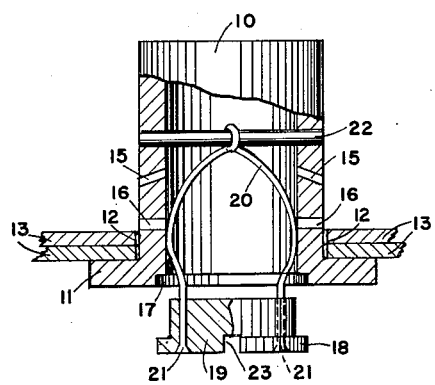
Fig. 3 is a sectional view of the snap fastener in released or disengaged position.

A spring fastener wire 20 has extremities 21 which are secured in the plug with the intermediate portion extending over a cross rod 22 which extends transversely through opposite walls of the sleeve at a distance from the flange and about midway of the ends of the slot extensions 15. The plug may be rotated a limited amount to twist the wire 20 into or within the sleeve 19 as shown by Fig. 3, and also rotated to register the intermediate portions of the wire with the opposite longitudinal slots 14 allowing the wire to spring outwardly therethrough. By thus rotating the plug the opposite wire portions are engaged in the slot extensions 15 and 16 as shown in Fig. 1, which moves the locking portions of the wire in slots 16 against the inner surface of the material (or materials) through which it is inserted.

In the outer end of the plug is a screw driver slot 23 which also serves as an indicator for positioning the plug with respect to the slots 14 in the sleeve; the flanged end having opposite marks 24 to register with the slot 23 when the fastener wire is seated in the slot extensions 15 and 16 in locking or fastening relation.

Figure 5:
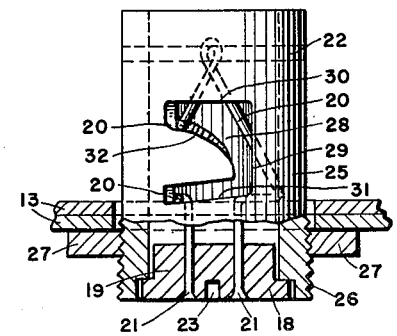
Fig. 5 is a sectional and elevational view of a modification of the snap fastener.
Figure 4:
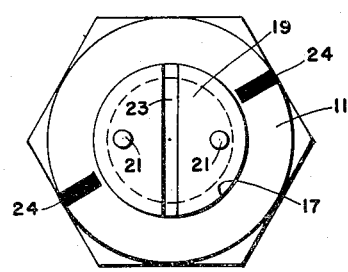
Fig. 4 is an end view of the snap fastener.

An adjustable snap fastener is shown in Fig. 5, in which a sleeve 25 has external threads 26 at one end to receive a nut 27 threaded thereon in place of a fixed flange. Side openings 28 at opposite sides of the sleeve each have a longitudinal portion 29, extensions 30 and 31 angularly at the ends thereof and a beveled edge 32 to facilitate the movement of the locking or fastener wire into and out of engaging position.

In these forms of the invention the sleeve with the fastener wire within it are inserted through an article or articles until the flange (or nut 27) engages the side of the article from which it is inserted. By inserting the plug, or giving it a slight twist in the sleeve the spring wire 20 will snap through the slots 14 for engaging the rear surface of the material through which the sleeve is inserted; and to lock it tightly, the plug is given a partial rotation in the sleeve locking the fastening wire in the inclined locking slot.

To remove the snap fasteners, the plugs are reversely rotated, withdrawing the fastening wires from the slots into the sleeves, and then removing the sleeves from the material. If the rivet should stick, it may be turned by the nut flange (or lock nut), or the sleeve may be held by this means while the plug is turned with a screw driver, or a similar implement.

With these constructions, rivets may be quickly applied or removed, and will snap firmly in place, requiring a positive action in overcoming the snap fastener action. In connecting correspondingly perforated sheets of airplane cowlings, for example, the rivets are inserted in place, the plugs are given a small twist and the sheets are locked tightly together.

While these preferred forms have been described in some detail, they should be regarded as illustrations and examples, and not as restrictions or limitations of the invention, as many changes may be made in the construction, combination and arrangement of the parts without departing from the spirit and scope of the invention.

The invention described herein may be manufactured and used by or for the Government of the United States of America for governmental purposes without the payment of any royalties thereon or therefor.

I claim:

1. A snap fastener for attachment in a hole from one side of an article, comprising a hollow sleeve having means at one end to limit insertion of the sleeve in the hole and opposite slots in the sleeve, each slot having angular lateral extensions and spring means confinable in the sleeve and adapted to spring outwardly through said slots and rotatable into said extensions to engage the rear side of an article through which the sleeve is inserted.

2. A snap fastener comprising a sleeve having means at one end to limit the insertion of the sleeve in an opening, the sleeve having opposite slots spaced from said means with lateral inclined extensions of each slot, a snap spring movable through the slots and extensions, means to attach the spring in the sleeve, and a plug in the end of the sleeve to engage the spring for moving it out of the extensions and withdrawing it into the sleeve when the plug is rotated in the sleeve.

3. A snap fastener comprising a sleeve having means at one end to limit its insertion in an opening and opposite slots spaced from the means with inclined locking extensions of each slot, spring means mounted in the sleeve and extensible through said slots and their locking extensions, a plug secured to the ends of the spring means and rotatable in the sleeve to project the spring means through the slots and extensions and to withdraw the spring means into the sleeve from extending positions, and means to seat the plug at the end of the sleeve when the spring means extends from the sleeve.

4. A snap fastener comprising a sleeve having means at one end to limit its insertion in an opening, the sleeve having opposite slots with extensions projecting laterally and angularly at the same side therefrom at the ends and inclined toward said means, a spring secured intermediate its ends to the sleeve, a plug secured to the ends of the spring and rotatable to move the spring so that portions register with the slots and snap outwardly therethrough into clamping position, and the outwardly extending portions of the spring being movable by the plug into the slot extensions for locking them into engaging positions.

5. A snap fastener comprising a sleeve having means at one end to limit its insertion in an opening, the sleeve having opposite slots with extensions projecting from the same side and angularly therefrom at the ends and inclined toward said means, a spring secured intermediate its ends to the sleeve, a plug secured to the ends of the spring and rotatable to move the spring so that portions register with the slots and snap outwardly therethrough into clamping position, the outwardly extending portions of the spring being movable by the plug into the slot extensions for locking them into engaging positions, and the plug having a flange fitting a recess at the end of the sleeve to seat the plug therein flush with the end of the sleeve when the spring portions are in outwardly extending engaging position.

6. A snap fastener comprising a sleeve having a flange at one end to limit the insertion of the sleeve in an opening, the sleeve having opposite longitudinal slots with lateral extensions from the ends extending angularly at the same side, a spring wire and means secured to the sleeve for engaging the wire intermediate its ends, the wire movable outwardly through the slots when in line therewith, and a plug rotatable in the flanged end of the sleeve attached to the ends of the spring wire and operative to withdraw the wire from the slots and to move the wire in line with the slots, and the plug being rotatable to engage the wire in the said angular extensions.

7. A snap fastener comprising a sleeve having a flange at one end to limit the insertion of the sleeve in an opening, the sleeve having opposite longitudinal slots with lateral extensions from the ends extending angularly at the same side, a spring wire and means secured to the sleeve for engaging the wire intermediate its ends, the wire movable outwardly through the slots when in line therewith, a plug to which the ends of the spring wire are secured in spaced apart relation; the plug being rotatable at the flanged end of the sleeve to move the wire into position to engage in the slots, to withdraw the wire from the slots, and to move the wire in the angular extensions for locking purposes; and the outer end of the plug and the outer end of the sleeve having related indicative means to determine the relative position of the wire with respect to the slots and extensions.

8. A snap fastener comprising a sleeve having external threads at one end and nut means adjustable thereon to abut material through which the sleeve is inserted, a plug rotatable in the end of the sleeve, a spring wire attached at its ends to the plug, a cross bar secured in the sleeve over which the intermediate portion of the wire extends, and the sleeve having opposite slotted portions through which the wire will spring when in line therewith with lateral inclined extensions of the slotted portions to provide locking means projecting outside of the sleeve and spaced from the nut means, the wire being withdrawn from the slotted portions and the extensions and moved to register therewith and to extend through them by the rotation of the plug.

9. A snap fastener insertable from the outer face of a material into an opening therethrough, comprising a sleeve having means at the outside of one end to engage the outer face of the material when the other end is inserted through the opening, to limit the projection of the sleeve at the back of the material, the sleeve having opposite longitudinal openings therethrough with lateral extensions projecting angularly therefrom and inclined toward said means at the inner end of the sleeve when so inserted, spring means secured intermediate its ends at the inside of the sleeve having portions to extend outwardly through the opposite slots and extensions, an operating member inside of the sleeve secured to the ends of the spring means and rotatable to project the opposite portions of the spring through the longitudinal openings and into the inclined extensions to move the projected portions to engage the inner face of the material to lockingly clamp the fastener thereto by engaging the inner and outer faces of the material.

JOHN P. FRANCESCO.

REFERENCES CITED

The following references are of record in the file of this patent:

UNITED STATES PATENTS

| Number | Name | Date |
|---|---|---|
| 530,083 | Bradley | Dec. 4, 1894 |
| 1,215,595 | Weikert | Feb. 13, 1917 |
| 1,456,555 | Hubbell | May 29, 1923 |
| 2,223,273 | Slessman | Nov. 26, 1940 |